United States Patent [19]

Hanyu et al.

[11] Patent Number: 4,648,340

[45] Date of Patent: Mar. 10, 1987

[54] AUTOMATIC BUTTONHOLE STITCHING DEVICE OF A COMPUTERIZED SEWING MACHINE

[75] Inventors: Susumu Hanyu; Kenji Kata, both of Tokyo; Yoshitaka Takahashi, Sagamihara, all of Japan

[73] Assignee: Janome Sewing Machine Co., Ltd., Tokyo, Japan

[21] Appl. No.: 727,903

[22] Filed: Apr. 26, 1985

[30] Foreign Application Priority Data

Apr. 26, 1984 [JP]  Japan ................................. 59-82957

[51] Int. Cl.⁴ .............................................. D05B 3/06
[52] U.S. Cl. ..................................... 112/447; 112/445
[58] Field of Search ............... 112/445, 447, 456, 458, 112/453, 446, 65

[56] References Cited

U.S. PATENT DOCUMENTS

| 4,250,821 | 2/1981 | Miyao et al. | 112/445 |
| 4,280,424 | 7/1981 | Carbonato et al. | 112/445 |
| 4,502,401 | 3/1985 | Asai et al. | 112/447 |

Primary Examiner—Peter Nerbun
Attorney, Agent, or Firm—Michael J. Striker

[57] ABSTRACT

In each of the trial stitchings for stitching a buttonhole by a computerized sewing machine, an increasing or decreasing amount by which a buttonhole size is to be corrected, is processed through an external input device, and in dependence upon corrected results a subsequent trial stitching is performed, whereby proper buttonhole sizes may be easily obtained.

6 Claims, 5 Drawing Figures

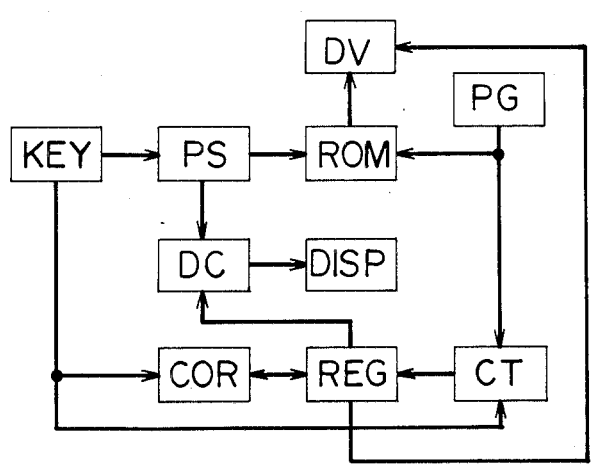
FIG_1
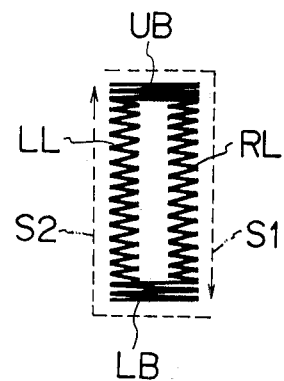
FIG_3
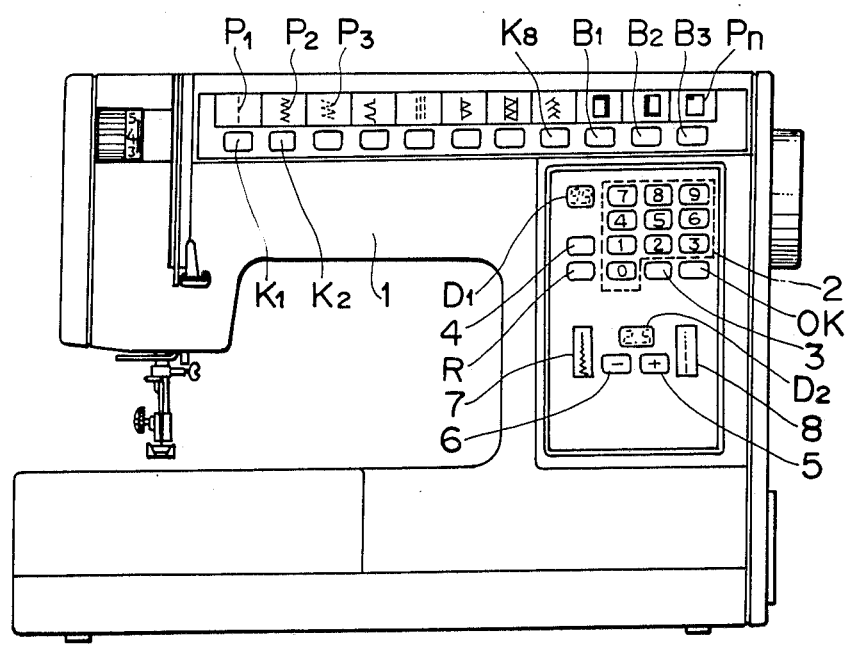
FIG_2

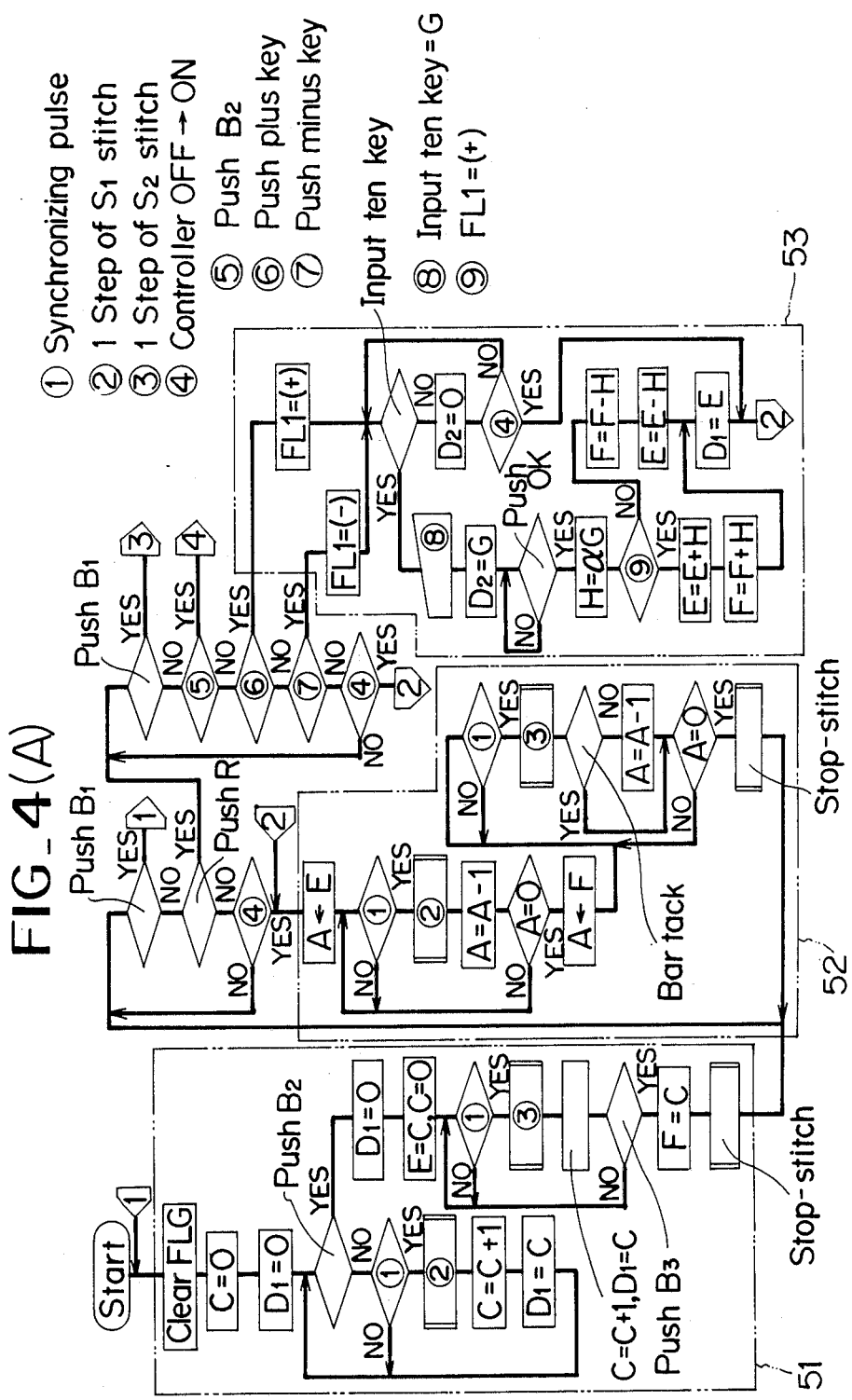
FIG_4(A)

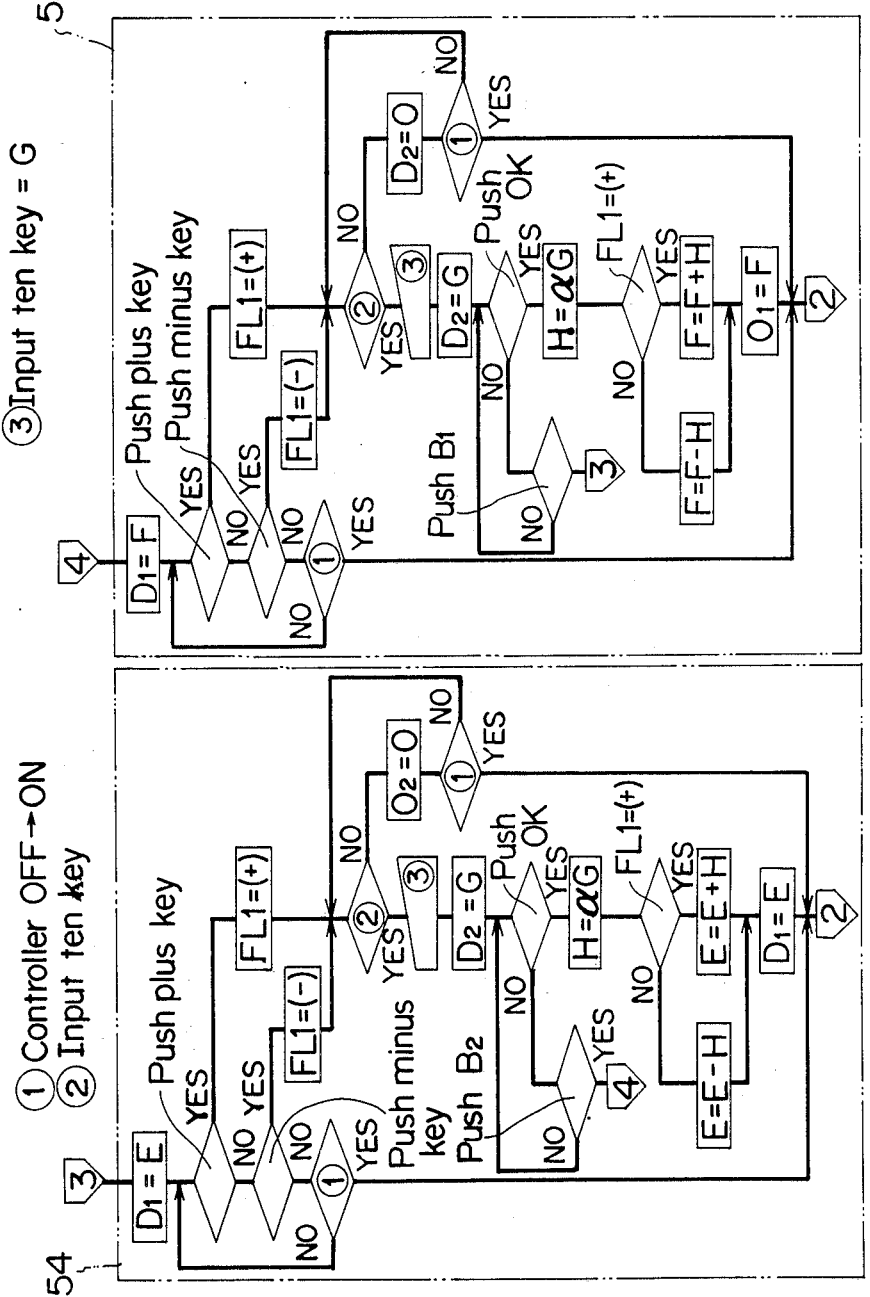

AUTOMATIC BUTTONHOLE STITCHING DEVICE OF A COMPUTERIZED SEWING MACHINE

BACKGROUND OF THE INVENTION

Field of the Invention

This invention relates to an automatic buttonhole stitching device of a computerized sewing machine for repeating buttonhole stitches of the same size.

When buttonhole stitches of the same size are repeated by means of a computerized sewing machine and if a trial stitching is made with a required size to an object button, data concerning the size of the buttonhole stitch in said trial stitching, are temporarily stored in a memory, and buttonhole stitches following the first buttonhole stitch are repeatedly formed with the same size in accordance with the stored data.

However, it is difficult to obtain buttonholes of the required size by one trial stitching, and lengths of right and left line tacks are often made unbalanced. Therefore, the trial stitchings are ordinarily made several times and a button is passed therethrough, to obtain a size of a buttonhole as desired while making confirmations.

For making the trial stitches, a machine operator confirms whether previous stitches are proper or not, and visually refers to the confirmed trial stitches in order to visually decide on a new size or repeat the stitches. Thus, the proper buttonhole size is selected.

SUMMARY OF THE INVENTION

It is an object of the present invention to provide an improved automatic buttonhole stitching device, wherein at the beginning of each of the trial stitchings an increasing or decreasing amounts of stitches are corrected and the data of the stitching numbers are indicated on the indication device.

This and other objects of the invention are attained by a computerized sewing machine which forms buttonhole stitches and stores data of stitches of right line and left line tacks of the formed buttonhole stitches in an electronic temporary memory, and automatically sets stitching processes of right line and left line tacks of buttonhole stitches to be formed subsequently to said stored data and includes an automatic buttonhole stitching device comprising an externally actuated input device for inputting data for correcting data of a stitching number of said stored right line and left line tacks; correction controlling means connected to said input device for controlling a correction of the data of the stitching number of said stored right line and left line tacks; and indicating means connected to said memory and to said input device for indicating the data of the stitching member of said right line and left line tacks, and the data of said correction control.

BRIEF DESCRIPTION OF THE DRAWINGS

FIG. 1 is a block diagram of a control according to the invention;

FIG. 2 is a front view of a sewing machine of the invention;

FIG. 3 is view showing a formation of a buttonhole stitching; and

FIGS. 4(A) and (B) are flow charts of the controls.

DETAILED DESCRIPTION OF THE PREFERRED EMBODIMENT OF THE INVENTION

In FIG. 2, a sewing machine body 1 is provided at the upper part of a front face thereof with pattern selecting keys (K1) to (K8), and (B1) (B2) (B3) which are operated for selecting a first group of patterns, and especially keys (B1) (B2) (B3) are operated for selecting stitchings of each step of buttonhole stitching. Pattern signal indications (P1) to (Pn) are each printed in correspondence to the pattern keys (K1) to (K8).

The machine body 1 is provided at the front standing part thereof with a keyboard 2. By designations of number of two figures, a second group of patterns are selected, as well as a value to be corrected as later mentioned is designated. Pattern signal indications of the second group are printed in correspondence to the pattern number on a rear side (not shown) of a top plate of the sewing machine.

A clear key 3 is operated for clearing a designation by the tenkey 2 or other keys. A first indicator (D1) indicates the number designated by the tenkey 2 or stored data for the buttonhole stitching with the numbers of the two figures. A memory key 4 is provided for designating a combination that a plurality of stitching patterns will be successively formed in order. A readout key (R) is provided for successively reading out the patterns of the designated combination to the indicator (D1), or designating the reading-out of memory data with respect to the buttonhole stitching.

A second indicator (D2) indicates a needle amplitude amount of a selected pattern and a fabric feed amount, and also indicates corrected values with the numbers of the two figures with respect to the buttonhole stitching.

A plus key 5 and a minus key 6 are provided for performing manual adjustment of the needle amplitude amount or the fabric feed amount in association with a manual operation of an amplitude designating key 7 or a feed maximal designating key 8. The plus key 5 increases the number indicated on the indicator (D2) per each of the operations with respect to the normal pattern, while the minus key 6 decreases it. The plus key 5 and the minus key 6 are also used to designate an addition or deduction of the amount to be corrected with respect to the buttonhole stitching. A correction input designating key (OK) designates an input of the correcting amount.

FIG. 1 is a block diagram showing a structure of a control, in which a key group (KEY) comprises the pattern selecting keys (K1) to (K8), (B1) (B2) (B3) and the keyboard 2 of FIG. 2. If a pattern is designated by an operation of the above members, a pattern selecting part (PS) specifies a group of stitch control signals stored in a memory (ROM) exclusive for the read-out, and controls a designation to form stitchings by the stitch control signal of said pattern. At this time, the pattern selecting part (PS) causes an indication control part (DC) to indicate a selection of the pattern in an indicating part (DISP) such as an indicating part (D1) in FIG. 2. The pattern is selected, and when the sewing machine is driven, a synchronizing pulse generator (PG) issues a pulse signal per each time of rotation of an upper shaft of the sewing machine, and each of the stitch control signals of said pattern is read out from the memory (ROM), and a drive control device (DV) of the needle lateral amplitude and the fabric feed is actuated.

If a buttonhole stitching key (B1) or (B2) of the key group (KEY) is selected, a counter (CT) receives a signal from the synchronizing pulse generator (PG) and counts the number of the formed stitches of the right line tack (RL) or the left line tack (LL).

A register (REG) memorizes the counted values individually in order to form the right line tack of said counted value or the left line tack.

A correction control means (COR), when the buttonhole stitching is selected, corrects and controls the values stored in the register (REG) in accordance with the designation of the key group (KEY). When the read-out key (R) is operated, this means (COR) reads out the stored data of the register (REG), and causes the indication control part (DC) to indicate it on the indicating part (D1). If the plus key 5 or the minus key 6 is operated and the correcting amount is designated by the key board 2, it indicates the data of the correcting amount on the indicating part (D2). Further, if the correction input designating key (OK) is operated, it adds or deducts a value of the indicator (D2) with respect to the value of the indicator (D1), and indicates a result on the indicator (D1) in order to form the right line tack or the left line tack of the indicated value.

In the present embodiments, the functions of the read-out exclusive memory (ROM), the pattern selecting part (PS), the counter (CT), the register (REG) and the correction control means (COR) are respectively alloted by the structure of the microcomputer installed in the machine body 1 or the program.

An actuation of the buttonhole stitching in the above mentioned structure will be explained in reference to flow charts of FIG. 4.

If a key (B1) for a first step of the buttonhole stitching is operated, a program starts.

In FIG. 4A, numeral 51 denotes a control part for trial stitchings. Numeral 52 designates a control part of automatic buttonhole stitching by reproduction. Numeral 53 designates a control part for correcting the full lengths of the buttonhole stitchings in common to the right and left line tacks; in FIG. 4B numeral 54 designates a control part for correcting the length of the right line tack. Numeral 55 denotes a control part for correcting the length of the left line tack.

In the part designated by numeral 51, each of flags (FLG) is cleared, and the value C of a counter (CT) is reset 0, and the number in an indicator (D1) is 0. Each time when a pulse signal is issued from a synchronizing pulse generator (PG), a stitch control signal is read out from a memory (ROM), and stitches of a first step of the buttonhole stitching shown in FIG. 3 are formed. When the stitching progresses to a right line tack (RL) after an upper bar tack (UB) has been formed, the value C of the counter (CT) increases per each of the pulse signals, and said increasing number is indicated in the indicator (D1). When the right line tack (RL) reaches a predetermined length and a key (B2) for a second step of the buttonhole stitching is operated, the number of the indicator (D1) is 0. The last value C shown on the indicator (D1) is stored in a memory (E) of the register (REG), and the value C of the counter (CT) is reset 0. Similarly, the stitches of a second step (S2) are formed per each of the synchronizing pulses, and when a lower bar tack (LB) is formed and the stitching advances to the left line tack (LL), the value C of the counter (CT) increases, and said increasing number is indicated on the indicator (D1). When the left line tack (LL) reaches a predetermined length and a key (B3) for stop-stitch of the buttonhole stitching is operated, the last value C shown in the indicator (D1) is stored in a memory (F) of the register (REG), and the stop stitch is performed and the trial stitching is finished.

When the stop-stitch is finished and key (B1) is operated the above mentioned trial stitching is redone; but if a controller (CONT), which is not shown is turned OFF or ON, an automatic buttonhole stitching is carried out by control part 51. With respect to the trial stiching, the stitching number of the right line tack stored in the memory (E) is stored in a memory (A) of the register (REG), and the stitches of the first step (S1) are formed. When the right line tack (RL) is formed, the value of the memory (A) is deducted, and when it becomes 0, that is, it is equal to the stitching number in the trial stitching, the stitching number of the left line tack stored in a memory (F), and the stitches of the second step (S2) are formed. Similarly, when it becomes 0, the stop-stitching is performed, the buttonhole stitching of the same stitching number as the trial stitching is finished. When the controller (CONT) is again operated, the buttonhole stitching of the same stitching number is carried out.

After performing the trial stitches, the read-out key (R) is operated without working the controller (CONT), and further if the pulse key 5 is operated in order to make the size of the buttonhole larger than that of the trial stitching, the correction in common to the right and left line tacks of the part 53 is performed, and the flag (FL1) is made (+). Then, the ten key 2 is operated, and a designation is made to a length for correcting the lengths of the right and left line tacks with a number of the two figures of units being "mm" and "1/10 mm".

If a correction input designating key (OK) is operated, a correction control means (COR) calculates the stitching number (H) corresponding to the corrected length (G) with an equation of "$H=\alpha G$" in reference to a coefficient $\alpha$ relating to a feed pitch of stitching of each of the line tacks, and the calculation is stored in the memory (H) of the register (REG).

In the trial stitching, the corrected stitching numbers (H) and the stitching numbers of the right and left line tacks stored in the memories (E) and (F) are added by means of the correction control means (COR), and stored in the memories (E) and (F). The values of the memory (E) are shown on the indicator (D1). Subsequently, the automatic buttonhole stitching is formed by the part 52 with the corrected stitching number.

If the minus key 6 is operated instead of the plus key 5, the flag (FL1) is made (−), and similarly the deduction is made and the automatic buttonhole stitching is performed with the corrected stitching number.

If the key (B1) for the first step is operated, without operations of the keys 5, 6, after the operation of the read-out key (R), the right line tack in the part 54 is corrected. The indicator (D1) shows the stitching number of the right line tack stored in the memory (E) during the trial stitching. The plus key 5 or the minus key 6 is operated and the length (G) of the right line tack is designated by the tenkey 2, and when the correction input designating key (OK) is operated, the length of the right line tack is corrected with respect to the plus or the minus, and the automatic buttonhole stitching is formed by the part (52) with the stitching numbers of the corrected right line tack and the left line tack at the trial stitching.

If the key (B2) for the second step is operated before operation of the correction input designating key (OK) or before operation of the key (B1), the correction of the left line tack shown is controlled by part 55, the automatic buttonhole stitching is performed by the part 52 with the stitching numbers of the corrected left line tack and the right line tack at the trial stitching.

As mentioned above, according to the invention, when the size of the buttonhole or the unbalance of the right and left line tacks are corrected in reference to the results of the trial stitching, a required size of the buttonhole is obtained by designating a correcting amount.

What is claimed is:

1. An automatic buttonhole stitching device for a computerized sewing machine having first memory means storing a plurality of pattern data for different patterns to be stitched including a buttonhole composed of first and second sections, the pattern data being selectively and sequentially read out with a timing pulse to control stitch forming instrumentalities of the sewing machine to produce a selected pattern of stitches, and the sewing machine being programmed to produce the selected pattern repeatedly, the automatic buttonhole stitching device comprising:

(a) pattern selecting means including ten-key switches 0–9 selectively operated to designate stitch control data for a selected pattern, said pattern selecting means further including at least first and second buttonhole switches (B1, B2,) a first buttonhole switch B1 being operated to produce a first section of the buttonhole and a second buttonhole switch B2 being operated to produce a second section of the buttonhole, each of said first and second sections including line-tack stitches RL, LL each formed with a fabric feeding amount of a predetermined parameter $\alpha$;

(b) first display means including a first display D1 responsive to a selective operation of said ten-key switches to display a selected pattern by way of a specific number;

(c) counter means CT operated in response to said timing pulse to count up said line-tack stitches of the buttonhole during formation of said buttonhole;

(d) second memory means REG for temporarily storing a value of said line-tack stitches counted up by said counter means:

(e) correction-control means COR for correcting the length of said once formed buttonhole, said correction control means including a data read-out switch R operated to read out said value stored in said second memory means REG to indicate said value in said first display D1, a plus-key switch 5 operated to lengthen the length of said buttonhole, a minus-key switch 6 operated to shorten the length of said buttonhole, and a second display D2 responsive to the operation of one of said plus and minus-key switches 5, 6 and then to the selective operation of said ten-key switches to display a designated correction value; and (f) an actuating switch OK operated to actuate said correction control means COR to make a calculation with said fabric feeding parameter $\alpha$ and said designated correction value under a predetermined formula, to thereby provide a calculated value of stitches to be needed for the length correction of said buttonhole, said calculated value being applied to the counted value stores in said second memory REG in one or the other way depending upon the selective operation of said plus and minus-key switches 5, 6 to provide a resultant final value for determining the number of said line-tack stitches of said buttonhole to be corrected, said final value being stored in said second memory means REG and indicated in said first display D1.

2. The automatic buttonhole stitching device as defined in claim 1, wherein each of said first and second sections of said buttonhole includes a predetermined number of bar-tack stitches.

3. The automatic buttonhole stitching device as defined in claim 1, wherein said second section of said buttonhole includes a predetermined number of locking stitches; and further including a third buttonhole switch B3 operated to form said predetermined number of locking stitches at the final stage in the formation of said buttonhole.

4. The automatic buttonhole stitching device as defined in claim 1, wherein said first display D1 is responsive to the operation of said counter means to display the number of line-tack stitches of said buttonhole counted up by said counter means CT.

5. The automatic buttonhole stitching device as defined in claim 1, wherein said second memory means REG includes a register having a plurality of stacks for storing a series of data produced during formation of said buttonhole.

6. The automatic buttonhole stitching device as defined in claim 1, wherein said first buttonhole switch B1 is operated after said data read-out switch R has been operated so as to correct the length of said line-tack stitches in said first section of said buttonhole while said second buttonhole switch B2 is operated after said data read-out switch R has been operated so as to correct the length of said line-tack stitches in said second section of said buttonhole.

* * * * *